United States Patent
Garceau

(10) Patent No.: US 8,042,853 B2
(45) Date of Patent: Oct. 25, 2011

(54) SLIDABLE ROOM SUPPORT SYSTEM

(75) Inventor: Bernard F. Garceau, Vandalia, MI (US)

(73) Assignee: Norco Industries, Inc., Compton, CA (US)

( * ) Notice: Subject to any disclaimer, the term of this patent is extended or adjusted under 35 U.S.C. 154(b) by 315 days.

(21) Appl. No.: 12/182,965

(22) Filed: Jul. 30, 2008

(65) Prior Publication Data

US 2008/0290689 A1 Nov. 27, 2008

Related U.S. Application Data

(60) Continuation-in-part of application No. 12/061,958, filed on Apr. 3, 2008, now abandoned, which is a continuation of application No. 11/742,176, filed on Apr. 30, 2007, now Pat. No. 7,354,088, which is a division of application No. 11/381,378, filed on May 3, 2006, now Pat. No. 7,210,269, which is a division of application No. 10/723,649, filed on Nov. 26, 2003, now Pat. No. 7,040,689, which is a continuation-in-part of application No. 10/668,038, filed on Sep. 22, 2003, now Pat. No. 7,073,844, which is a continuation of application No. 10/002,032, filed on Nov. 15, 2001, now Pat. No. 6,623,066.

(51) Int. Cl.
*B60P 3/34* (2006.01)
(52) U.S. Cl. .................................. 296/26.13
(58) Field of Classification Search .............. 296/26.13, 296/26.12, 26.08, 26.09, 26.04, 26.05, 165, 296/171, 172, 175; 52/67
See application file for complete search history.

(56) References Cited

U.S. PATENT DOCUMENTS

| | | |
|---|---|---|
| 1,972,415 A | 9/1934 | Anderson |
| 2,739,833 A | 3/1956 | Schenkel et al. |
| 2,744,781 A | 5/1956 | Black |
| 2,857,197 A | 10/1958 | Hogg |
| 2,877,509 A | 3/1959 | Klibanow |
| 2,898,143 A | 8/1959 | Ferrera |
| 2,898,144 A | 8/1959 | Ferrera |
| 2,902,312 A | 9/1959 | Ferrera |
| 2,987,342 A | 6/1961 | Meaker et al. |
| 3,341,986 A | 9/1967 | Brosig |
| 3,692,349 A | 9/1972 | Ehrlich |
| 3,712,005 A | 1/1973 | Eschbach et al. |
| 4,103,462 A | 8/1978 | Freller |
| 4,270,791 A | 6/1981 | Tann |
| 5,090,749 A | 2/1992 | Lee |
| 5,237,782 A | 8/1993 | Cooper |
| 5,248,180 A | 9/1993 | Hussaini |
| 5,295,430 A | 3/1994 | Dewald, Jr. et al. |
| 5,332,276 A | 7/1994 | Blodgett, Jr. |
| 5,634,683 A | 6/1997 | Young |
| 5,791,715 A | 8/1998 | Nebel |

(Continued)

FOREIGN PATENT DOCUMENTS

CA 2136673 3/1996

(Continued)

*Primary Examiner* — H Gutman
(74) *Attorney, Agent, or Firm* — Hahn Loeser & Parks LLP

(57) ABSTRACT

A slidable room assembly comprises a vehicle body having an opening formed in an exterior wall, and a reciprocable slideout unit or compartment disposed in the opening and slidable between a retracted position and an extended position. A cable support system supports the slidable room during movement of the slideout unit. Sliding movement of the slideout unit is controlled by a drive mechanism separate from the cable support system.

11 Claims, 13 Drawing Sheets

FIG. 2

U.S. PATENT DOCUMENTS

| | | | |
|---|---|---|---|
| 5,800,002 | A | 9/1998 | Tiedge et al. |
| 5,860,693 | A | 1/1999 | Ehrlich |
| 6,116,671 | A | 9/2000 | Schneider |
| 6,152,520 | A | 11/2000 | Gardner |
| 6,254,171 | B1 | 7/2001 | Young, Sr. |
| 6,393,769 | B1 | 5/2002 | Mertik et al. |
| 6,502,893 | B1 | 1/2003 | Corliss, Jr. |
| 6,536,821 | B1 | 3/2003 | Gardner |
| 6,623,066 | B2 | 9/2003 | Garceau et al. |
| 6,644,719 | B2 | 11/2003 | Young, Sr. |
| 6,783,164 | B2 | 8/2004 | Bortell |
| 7,040,689 | B2 | 5/2006 | Few et al. |
| 7,108,005 | B1 | 9/2006 | Christenson et al. |
| 7,210,269 | B2 | 5/2007 | Garceau et al. |
| 7,370,900 | B1 | 5/2008 | Blodgett, Jr. |
| 7,461,480 | B1 | 12/2008 | Gardner |
| 2002/0063441 | A1 | 5/2002 | Young, Sr. |
| 2002/0089212 | A1 | 7/2002 | Garceau et al. |
| 2004/0094983 | A1 | 5/2004 | Bortell |
| 2004/0145204 | A1 | 7/2004 | Few et al. |
| 2005/0179278 | A1 | 8/2005 | Yoder |
| 2005/0230989 | A1 | 10/2005 | Nebel |
| 2006/0186683 | A1 | 8/2006 | Garceau et al. |
| 2007/0194586 | A1 | 8/2007 | Gardner |
| 2007/0216183 | A1 | 9/2007 | Few et al. |

FOREIGN PATENT DOCUMENTS

| | | |
|---|---|---|
| DE | 1095137 | 12/1960 |
| GB | 882258 | 11/1961 |

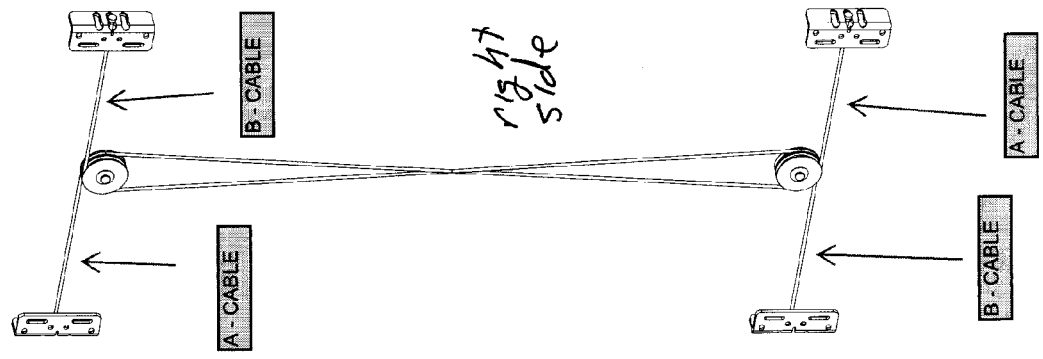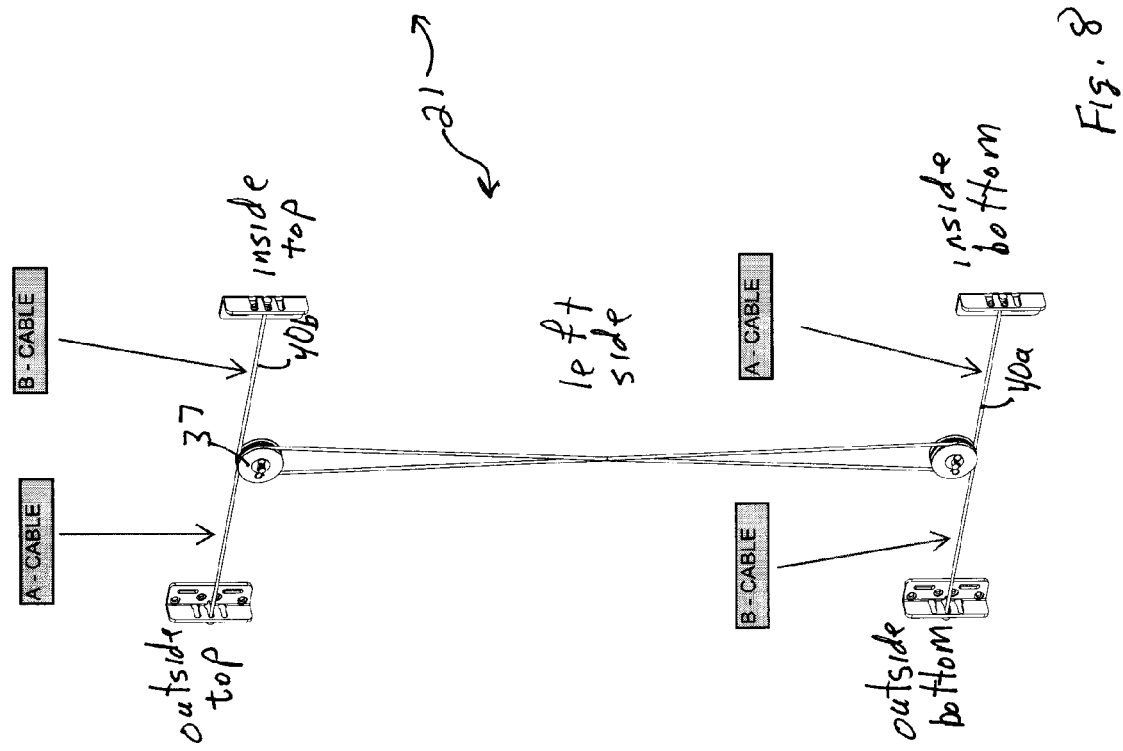
Fig. 8

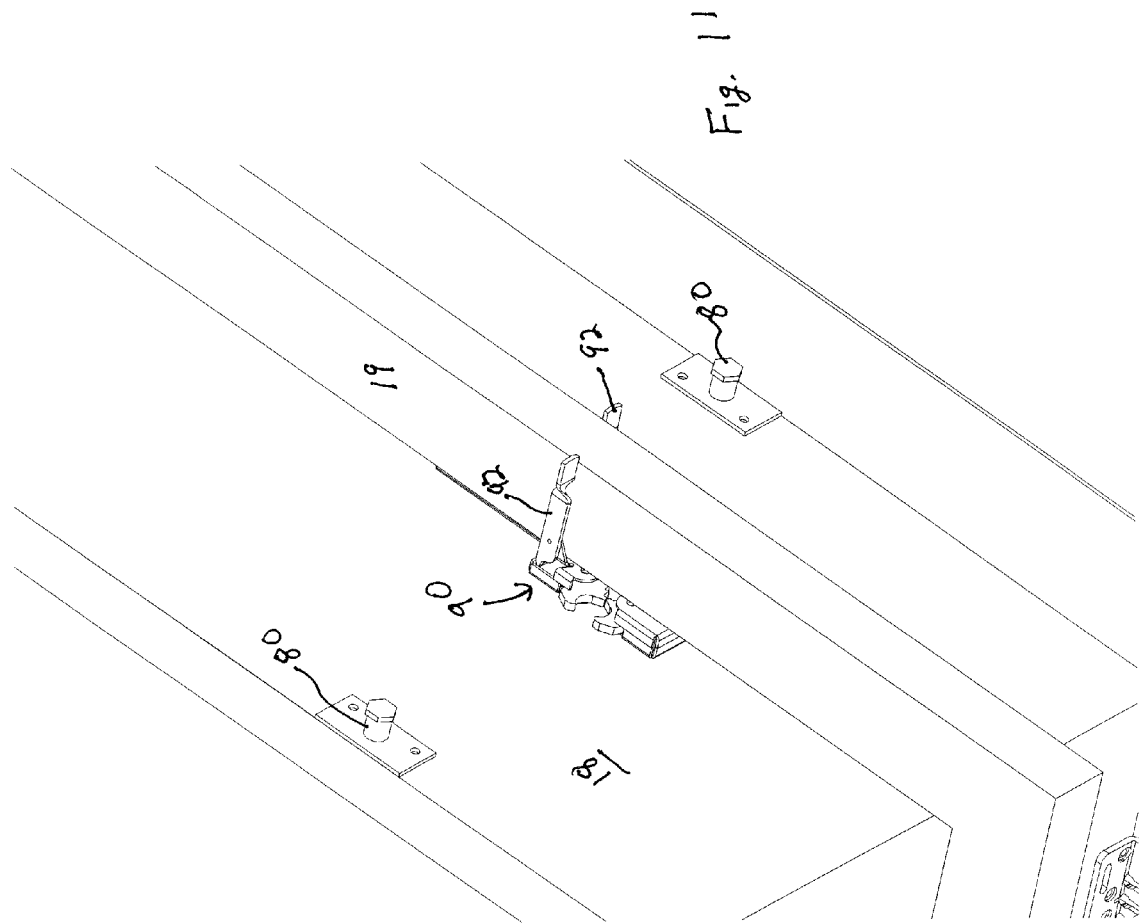

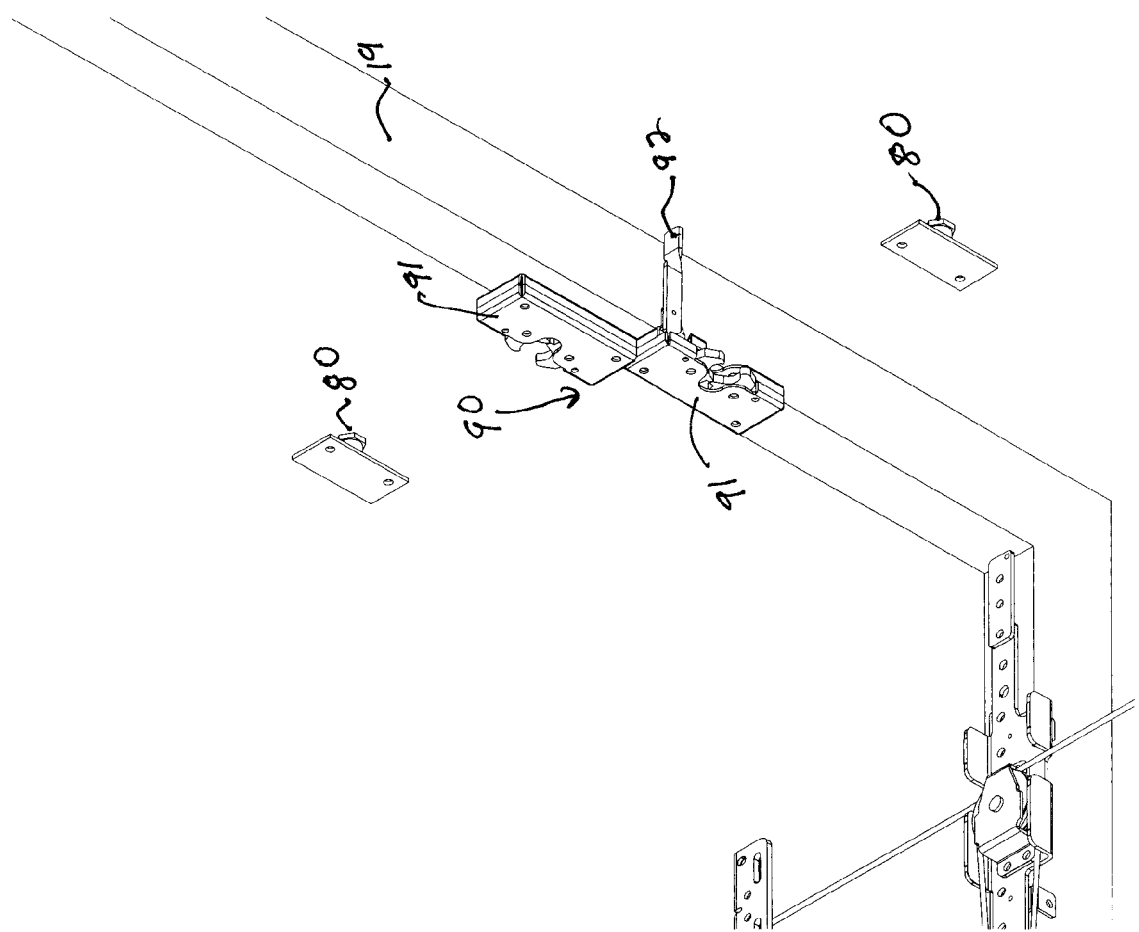

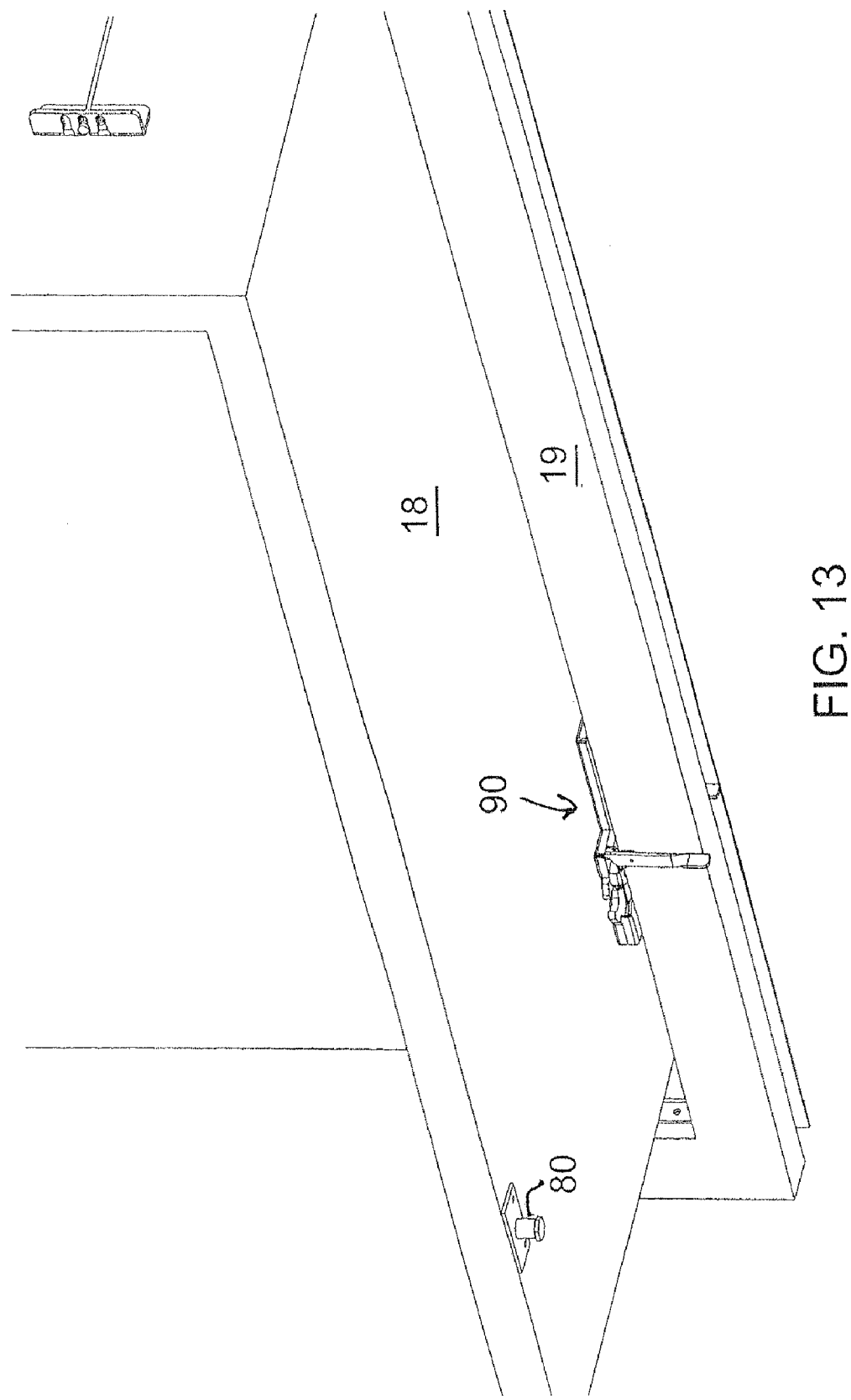

SLIDABLE ROOM SUPPORT SYSTEM

This application is continuation-in-part of U.S. patent application Ser. No. 12/061,958, filed Apr. 3, 2008, now abandoned, which is a continuation of U.S. patent application Ser. No. 11/742,176, filed Apr. 30, 2007, now U.S. Pat. No. 7,354,088, which is a divisional application of U.S. patent application Ser. No. 11/381,378, filed May 3, 2006, now U.S. Pat. No. 7,210,269, which is a divisional application of U.S. patent application Ser. No. 10/723,649, filed Nov. 26, 2003, now U.S. Pat. No. 7,040,689, which is a continuation-in-part of U.S. patent application Ser. No. 10/668,038, filed Sep. 22, 2003, now U.S. Pat. No. 7,073,844, which is a continuation of U.S. patent application Ser. No. 10/002,032, filed Nov. 15, 2001, now U.S. Pat. No. 6,623,066.

BACKGROUND OF THE INVENTION

This invention relates generally to a slidable room assembly, particularly to a slidable room for a vehicle for a vehicle having a slidable room or compartment that is retracted when the vehicle is in motion and may be extended to afford more room when the vehicle is parked.

Recreation vehicles including motor homes, fifth wheel trailers and travel trailers may be provided with an extendable slidable unit for increasing the vehicle's living space. This slidable unit may be extended for use when the vehicle is parked and is retracted in a telescoping manner when the vehicle is to be moved.

The foregoing illustrates limitations known to exist in present slidable room assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a vehicle comprising: at least one wall having an opening therein; a room inserted into the opening of the at least one wall, the room being reciprocable between an extended position and a retracted position; a cable support system attached to the at least one wall and the room; a means for timing the reciprocation of the room; and a means for reciprocating the room between the extended position and the retracted position.

In another aspect of the present invention, this is accomplished by providing a vehicle comprising: at least one wall having an opening therein; a room inserted into the opening of the at least one wall, the room being reciprocable between an extended position and a retracted position; and a cable support system attached to the at least one wall and the room, the cable support system comprising: four pairs of cables, a plurality of pulleys attached to the vehicle, first ends of each cable being attached to the room, second ends of the cables of a pair of cables being connected together, the connected together second ends of one pair of cables being connected to the connected together second ends of another pair of cables forming a connected set of cables, each cable extending about at least one of the pulleys, the first end of one cable of a pair of cables is connected to an upper portion of the room and the first end of the other cable of a pair of cables is connected to a lower portion of the room, the first end of one cable of a pair cables is connected to an outside portion of the room and the first end of the other cable of a pair of cables is connected to an inside portion of the room, two first ends of the connected set of cables are connected to a left side of the room and the other two first ends of the connected set of cables are connected to a right side of the room.

In a further aspect of the present invention, this is provided by a vehicle comprising: at least one wall having an opening therein; a room inserted into the opening of the at least one wall, the room being reciprocable between an extended position and a retracted position; and a cable support system attached to the at least one wall and the room, and a latch mechanism capable of latching the room in a fixed position, the latch mechanism including two strikes, an inside strike attached to an inside portion of the room and an outside strike attached to an outside portion of the room, the latch mechanism engaging the inside strike when the room is in the extended position and the latch mechanism engaging the outside strike when the room is in the retracted position.

The foregoing and other aspects will become apparent from the following detailed description of the invention when considered in conjunction with the accompanying drawing figures.

BRIEF DESCRIPTION OF THE DRAWING FIGURES

FIG. 8 is a schematic representation of the cables shown in FIGS. 6 and 7;

FIG. 11 is a bottom perspective of a latching system for use with a slidable room;

FIG. 12 is a top perspective view of the latching system shown in FIG. 11, the slidable room being removed to more clearly illustrate portions of the latching system; and FIG. 13 is a bottom perspective view of the latching system shown in FIG. 11 showing the slidable room in place.

DETAILED DESCRIPTION

Figure 1:
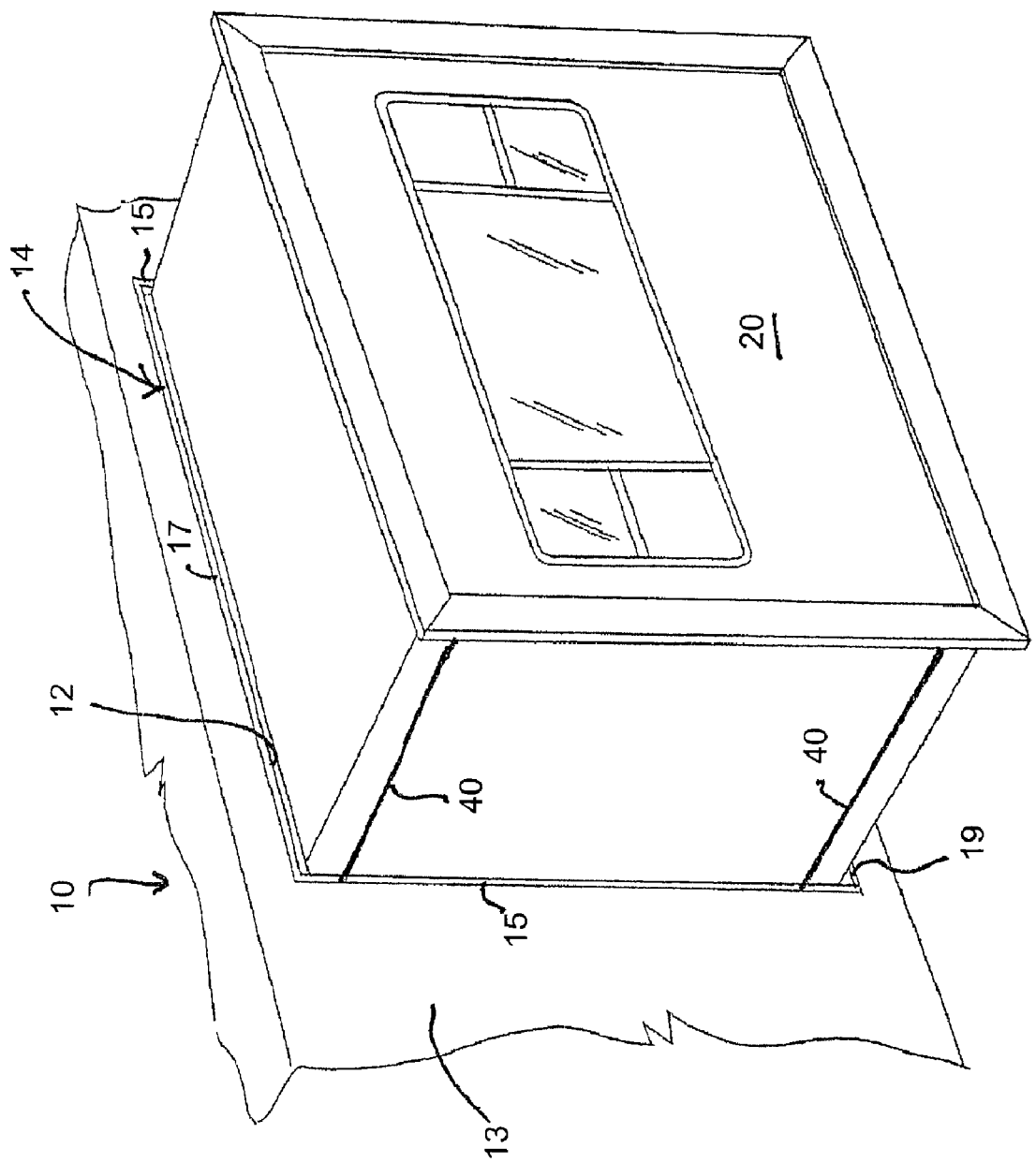
FIG. 1 is a perspective exterior view of a portion of a vehicle having a slidable room according to the present invention, showing the slidable room in a fully extended position.

FIG. 1 shows a portion of a vehicle 10 with a slidable room 20 in an extended position. During movement or transport of the vehicle, the slidable room 20 is normally fully retracted into the vehicle 10. The vehicle wall 13 has an opening 12 into which the slidable room 20 fits. Positioned about the edges of the opening 12 is a frame 14. Frame 14 consists of two jambs 15, a header 17 and sill 19. Preferably, one or more rollers are attached to sill 19 and room 20 rolls on these rollers when room 20 is extended or retracted. Optionally, seals, such as a polymeric strip, can be provided on the inside of frame 14 to provide a weather tight seal between the frame and the room 20. Room 20 can include a dinette, wardrobe, library, storage, bedroom, closet, kitchen, etc. compartment. A plurality of cables 40 are attached to the slidable room 20 and pass about pulleys attached to the vehicle wall 13.

The vehicle 10 may be a self-powered vehicle, such as a recreational vehicle, or may be a trailer that is adapted to be towed, e.g., by an automobile or a truck tractor. The vehicle may be one that is designed for living (as a house trailer), or may be a work vehicle (e.g., a mobile library). The slidable room 20 can also be used with fixed structures such as modular housing or vacation homes.

Figure 2:
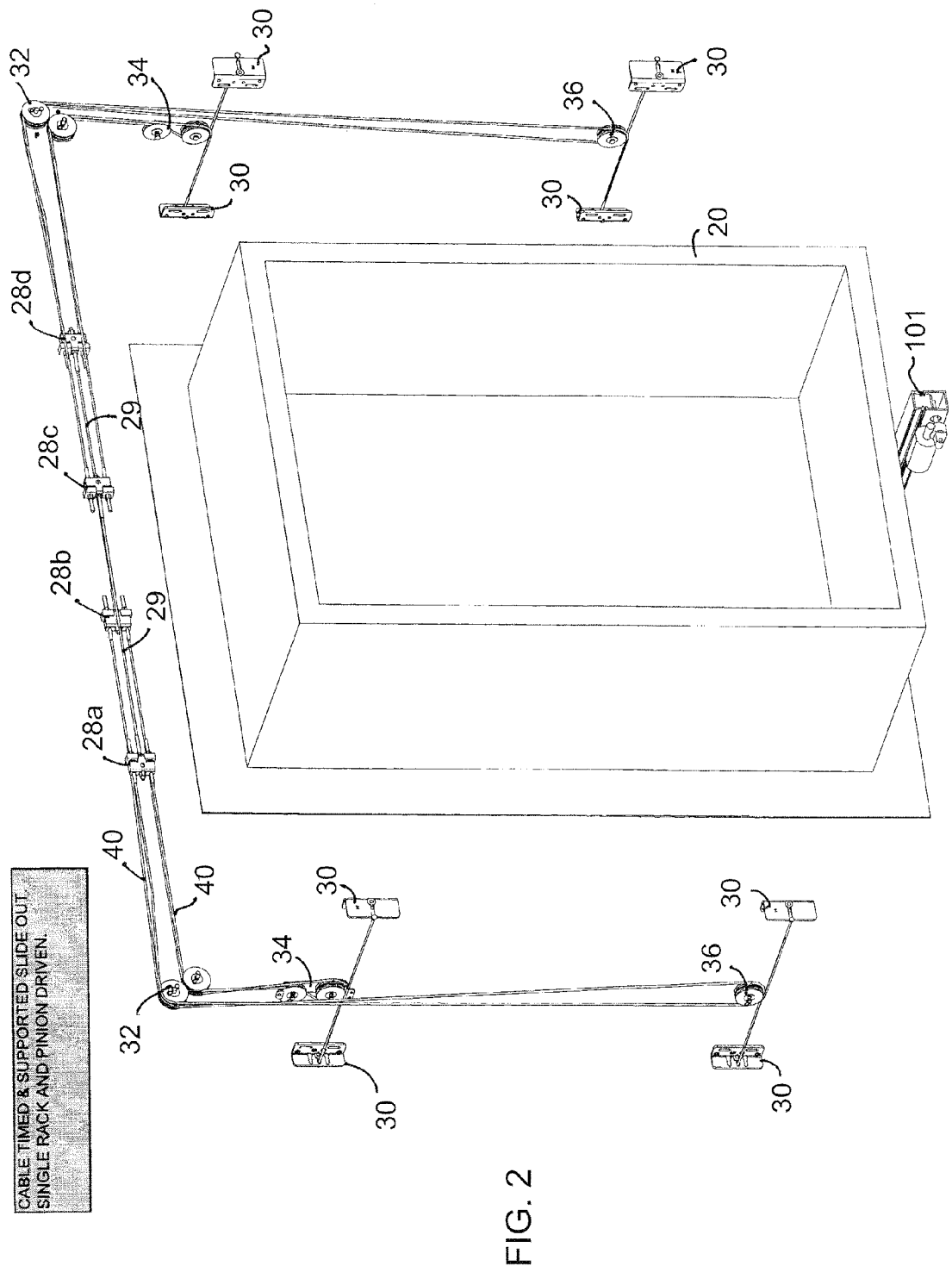
FIG. 2 is a perspective interior view of the slidable room showing a first embodiment of a cable support system.
Figure 3:
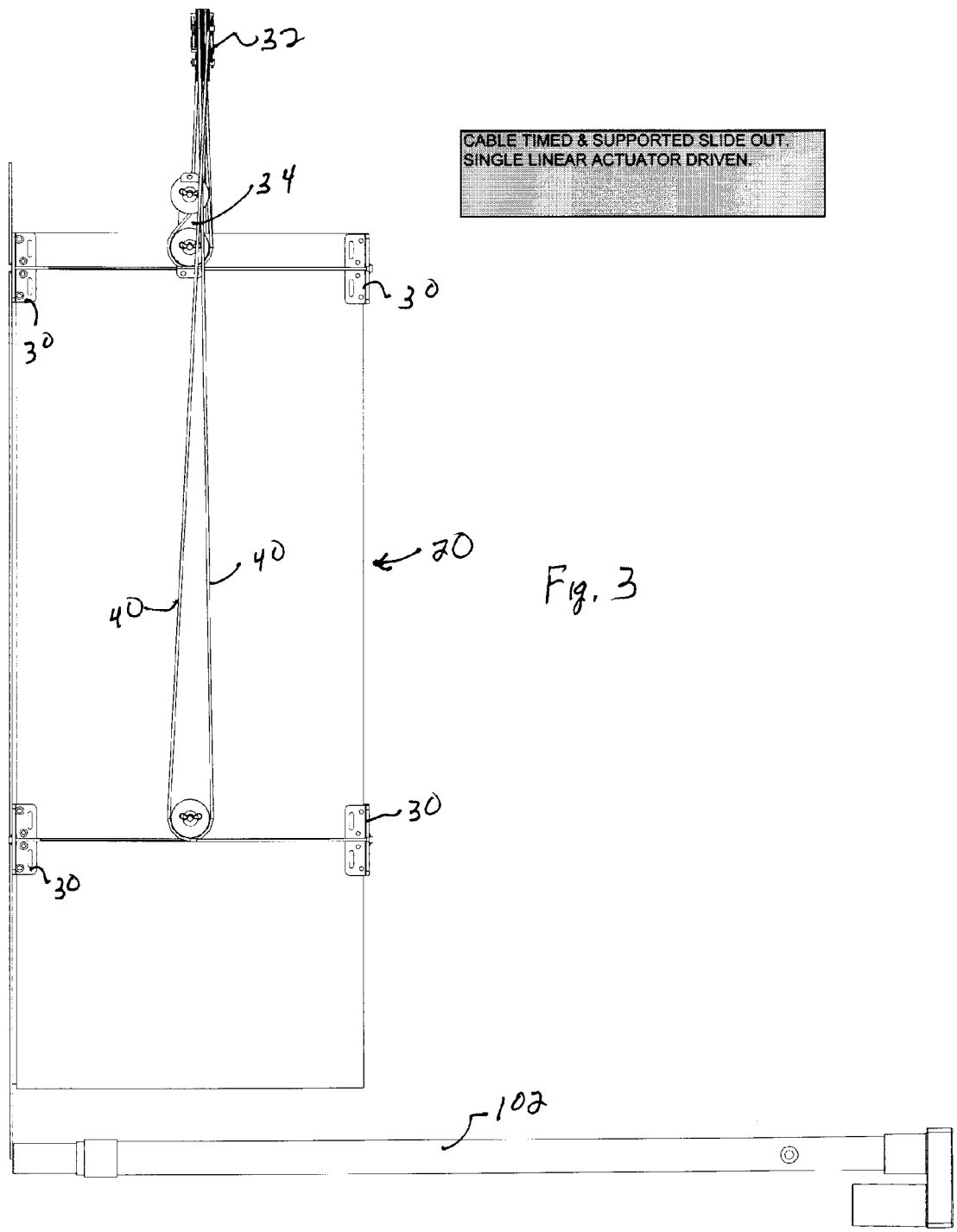
FIG. 3 is a side view of the slidable room shown in FIG. 2.

FIGS. 2 through 5 illustrate a first embodiment of a cable support system 21. Cable support system 21 is interconnected to provide timing of the cables 40 to maintain the slidable room 20 aligned as the room is extended and retracted. A single rack and pinion drive system 101 is shown in FIGS. 2 and 3. Other drive systems, such as a linear actuator or ball screw actuator 102 shown in FIGS. 3 and 10 or a hydraulic drive system 103 shown in FIG. 9 can be used with the cable support system 21 shown in FIGS. 2 through 5. Room 20 with cable support system 21 shown in FIGS. 2 through 5 may also be manually moved.

Figure 4:
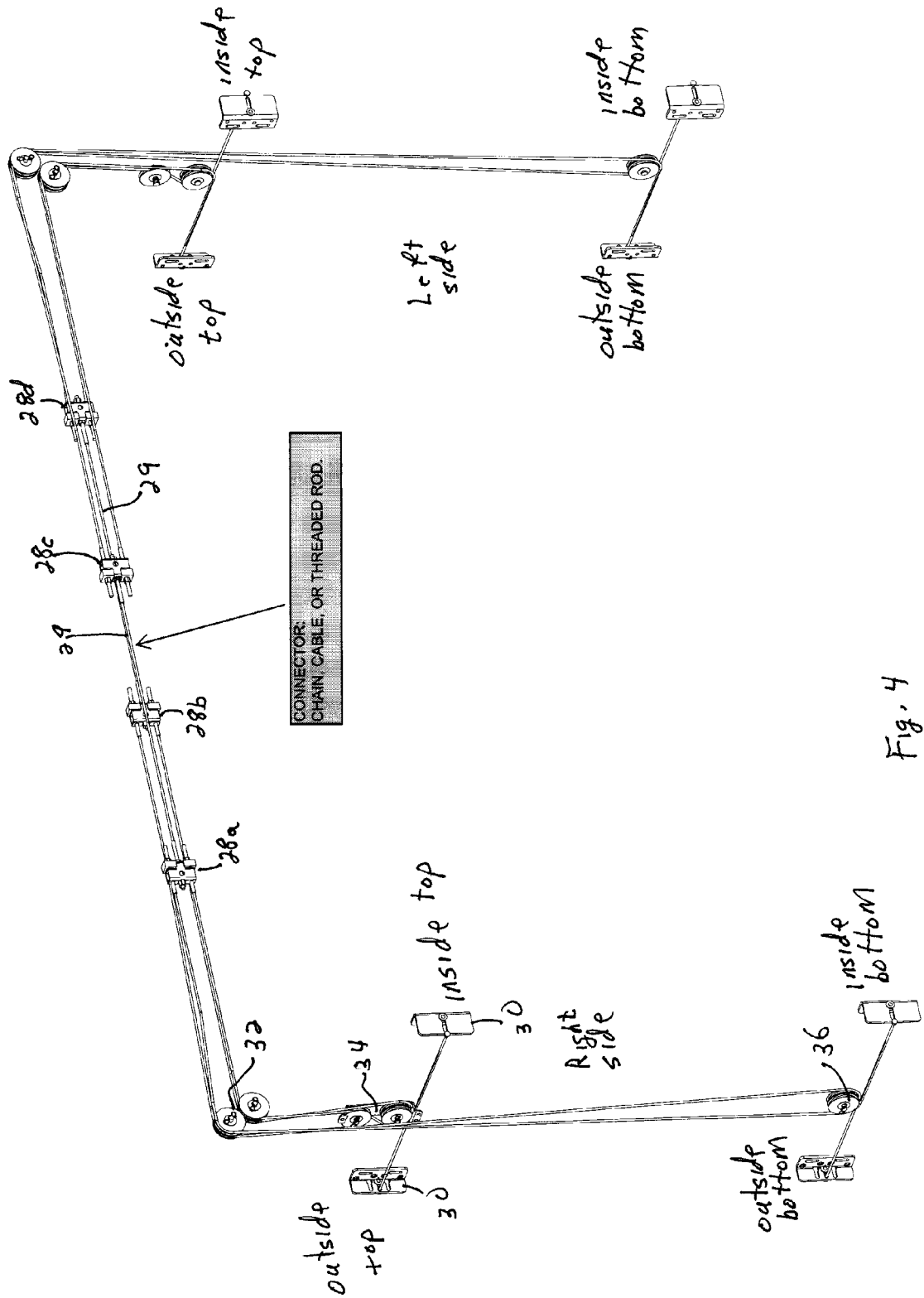
FIG. 4 is a schematic representation of the cables, chains and cable chain connectors shown in FIGS. 2 and 3.
Figure 5:
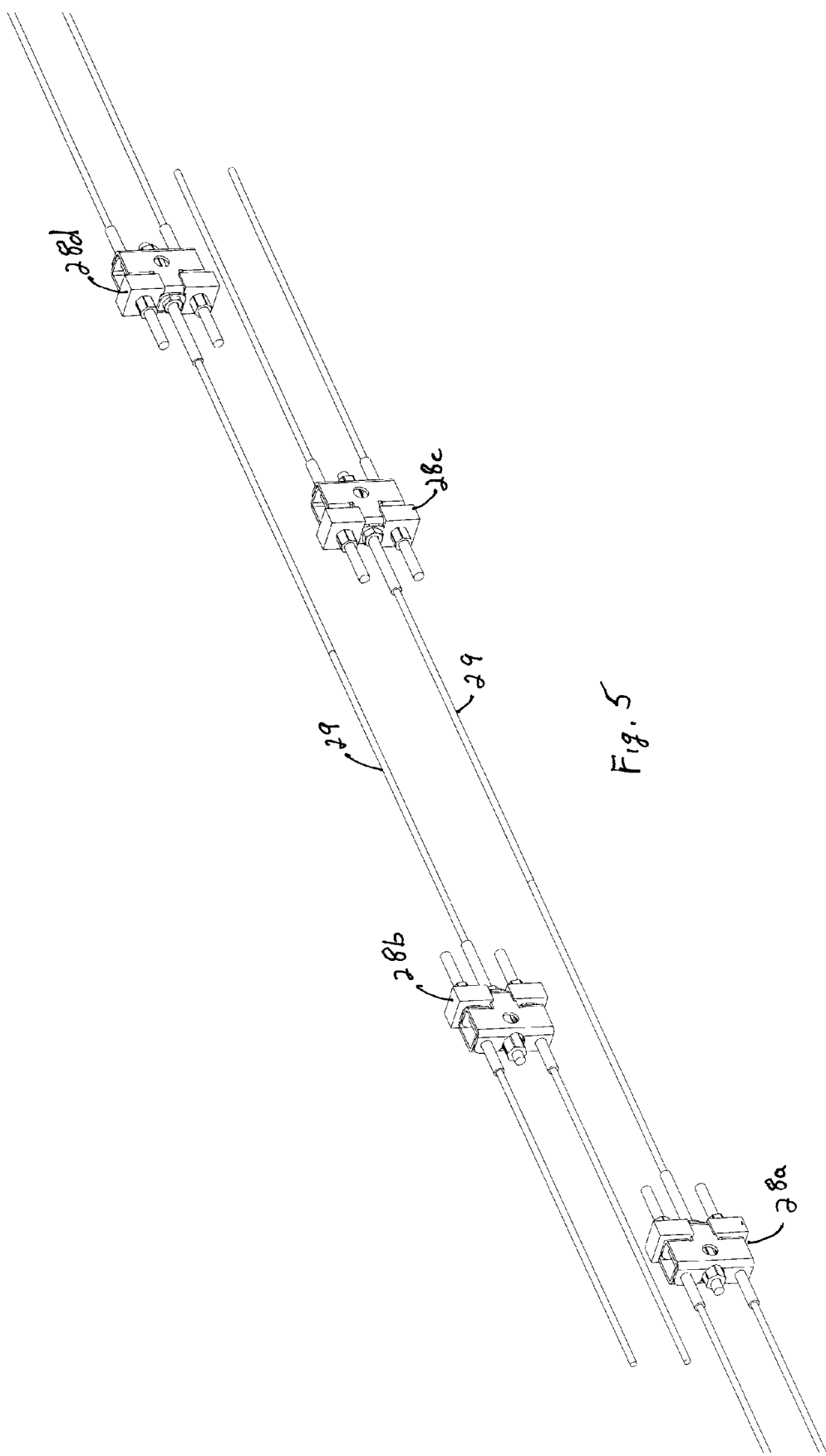
FIG. 5 is an enlarged view of a portion of the schematic representation shown in FIG. 4.

Referring to FIGS. 4 and 5, cable support system 21 is divided into left side cables and right side cables. Each side is further divided into inside cables and outside cables. Each pair of inside cables and each pair of outside cables includes a top cable and a bottom cable. Each pair of top and bottom cables are connected by a cable connector 28a, 28b, 28c and 28d. Cable connector 28a connects left side top and bottom inside cables together. Cable connector 28b connects left side top and bottom outside cables together. Cable connector 28c connects right side top and bottom outside cables together. Cable connector 28d connects right side top and bottom inside cables together. Cable connector 28a (left side inside cables) is connected to cable connector 28c (right side outside cables) by joiner 29. Joiner 29 can be a threaded rod, a chain or a flexible cable. Cable connector 28b (left side outside cables) is connected to cable connector 28d (right side inside cables) by joiner 29.

The free ends of cables 40 are attached to room 20 by anchors 30. The bottom cables on each side pass around direction changing pulleys 32, 36. In one embodiment, pulleys 32 and 36 are double pulleys or sheaves. The top cables on each side pass around direction changing pulleys 32 and 34. In one embodiment, as shown in the FIGURES, pulleys 32 are two double pulleys. Also, as shown in the FIGURES, pulleys 34 are a double pulley and an offset single pulley. Other arrangements of the pulleys can be used depending upon the size and shape of the room and the space available in the vehicle wall 13.

Each set of interconnected cables, a pair of left side cables connected to a pair of right side cables, can also be described as a double ended cable. The two pairs of cables being connected by joiner 29 to form the double ended cable.

When room 20 is moved from the retracted position to the extended position by drive 101, 102, 103, 104, the outside cables, attached to room 20, extend, which in turn pulls on connectors 28b and 28c. Connectors 28a and 28d, respectively, are pulled by joiners 29, which in turn, retracts the inside cables. When room 20 is moved from the extended position to the retracted position, the inside cables extend, which in turn pulls on connectors 28a and 28d. Connectors 28b and 28c are then pulled by joiners 29. Connectors 28b and 28c in turn pull on the outside cables to retract the outside cables.

To prevent the room 20 from being cocked or twisted as the room 20 is being extended or retracted, a means for timing should be provided. In the embodiment shown in FIGS. 2 through 5, timing is provided by interconnecting the left side cables to the right side cables by joiners 29. For example, if the left side of room 20 begins to extend faster than the right side of room 20, left side outside cables will extend further than the right side outside cables. This will pull connector 28b faster than connector 28c is being pulled, and in turn, pull on connector 28d causing the right side inside cables to be pulled or retracted faster, which will move the right side of room 20 faster until the right side catches up with the left side. Joiners 29 can be thought of as a force equalizer. When the force of extension is more on one side than the other, joiner 29 transfers that force to opposite cables on the other side, equalizing the forces on the room 20.

Figure 6:
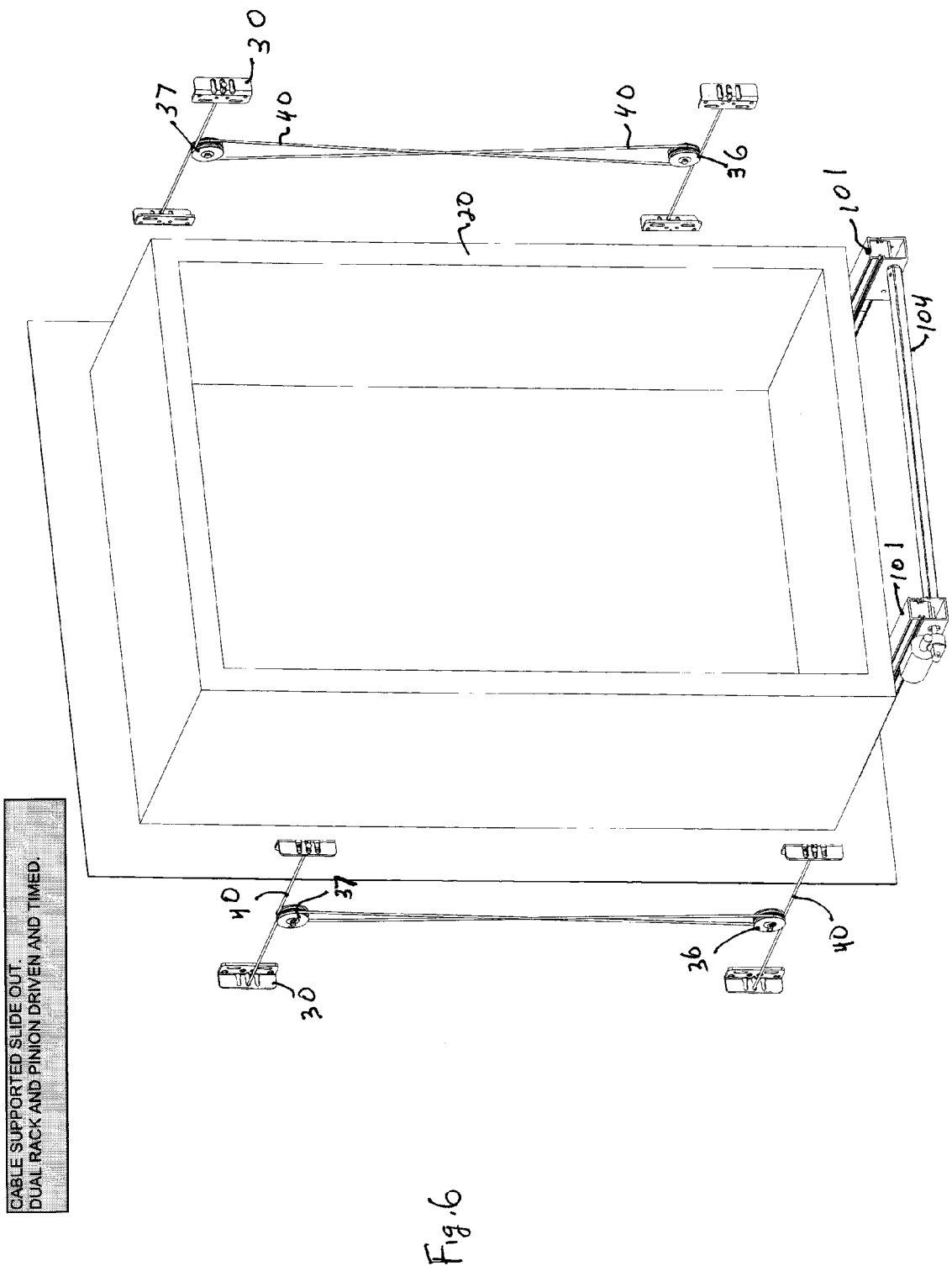
FIG. 6 is a perspective interior view of the slidable room showing a second embodiment of a cable support system.
Figure 7:
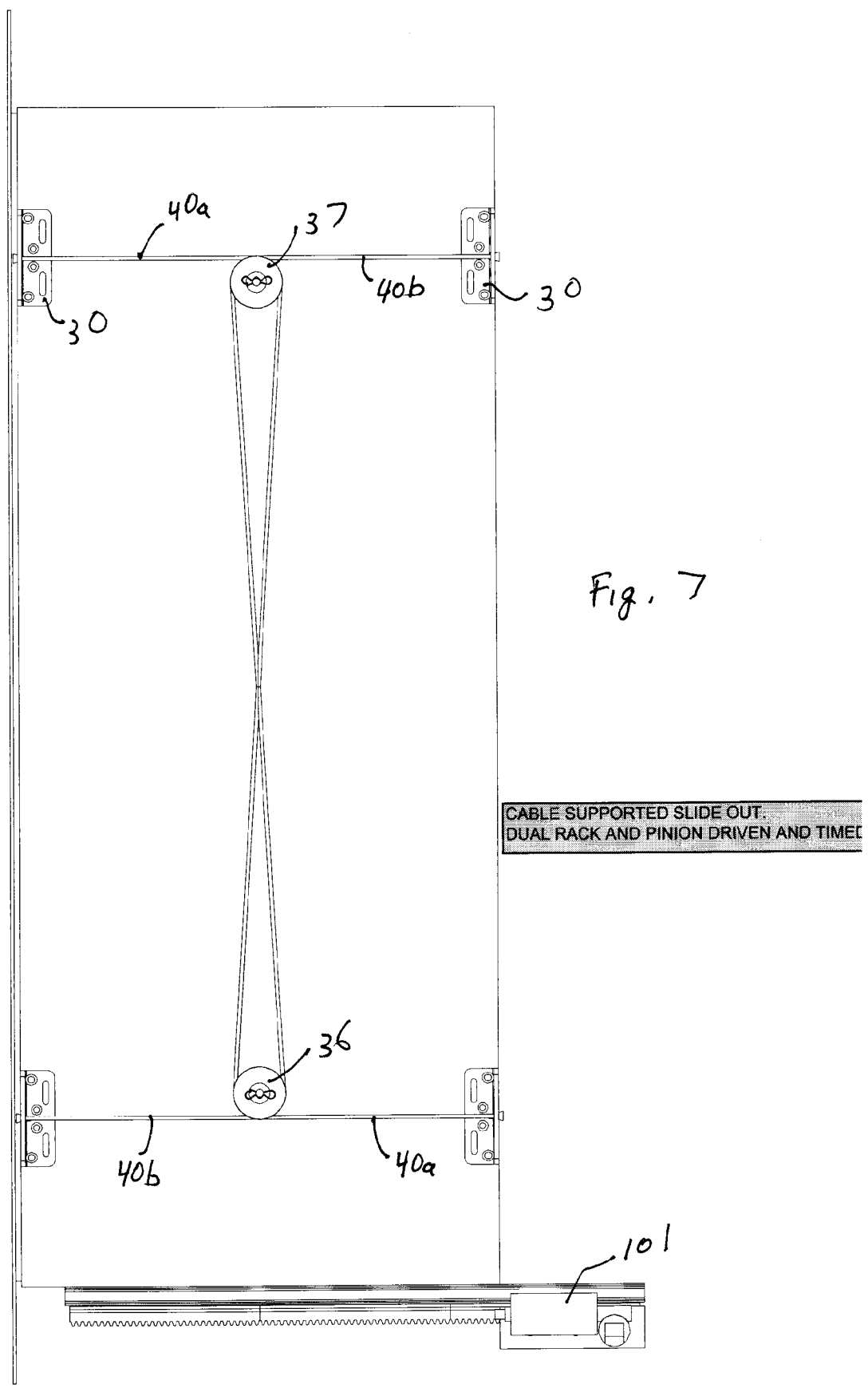
FIG. 7 is a side view of the slidable room shown in FIG. 6.
Figure 9:
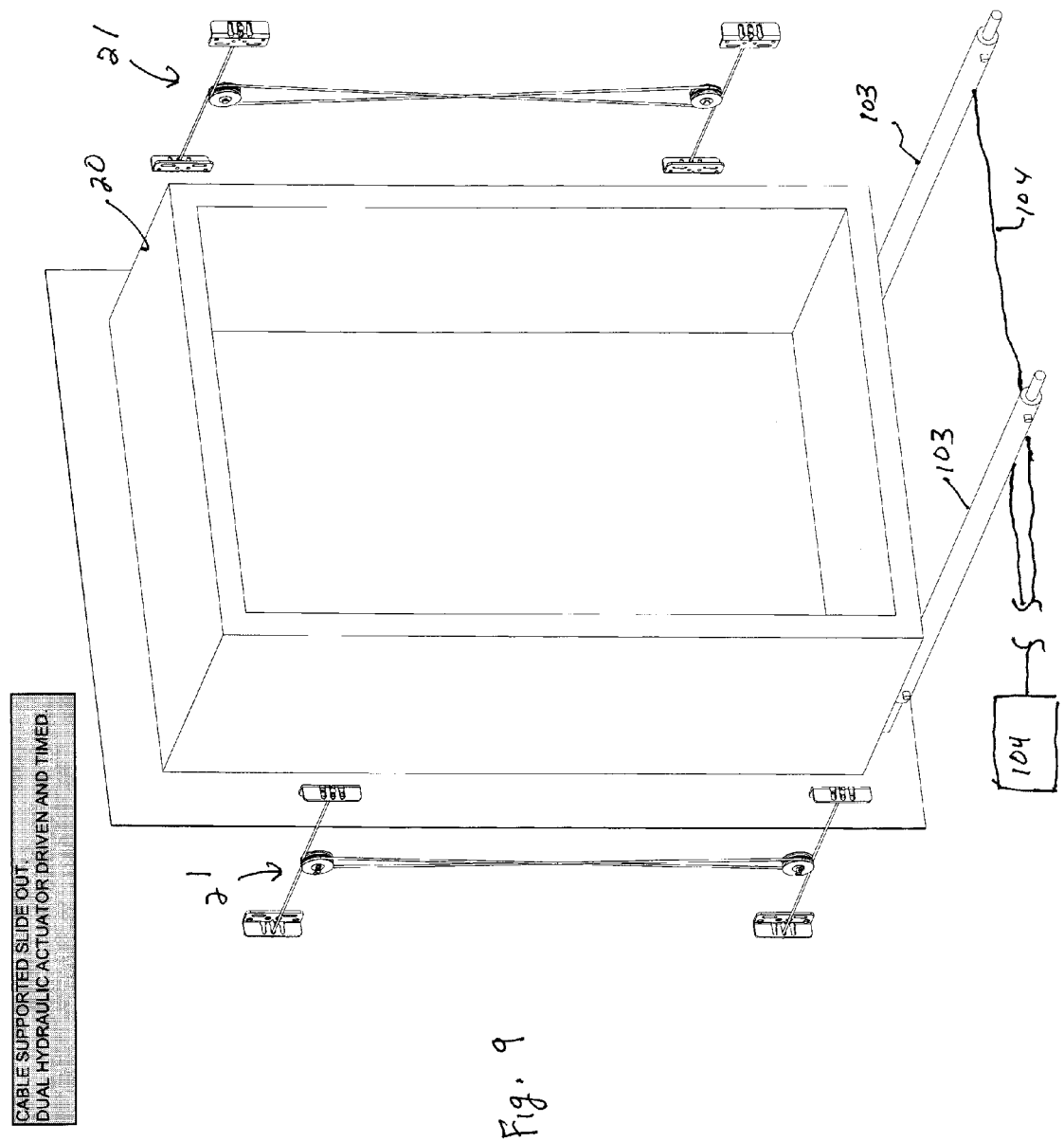
FIG. 9 is a further perspective interior view of the slidable room shown in FIG. 5 showing an alternative drive mechanism.
Figure 10:
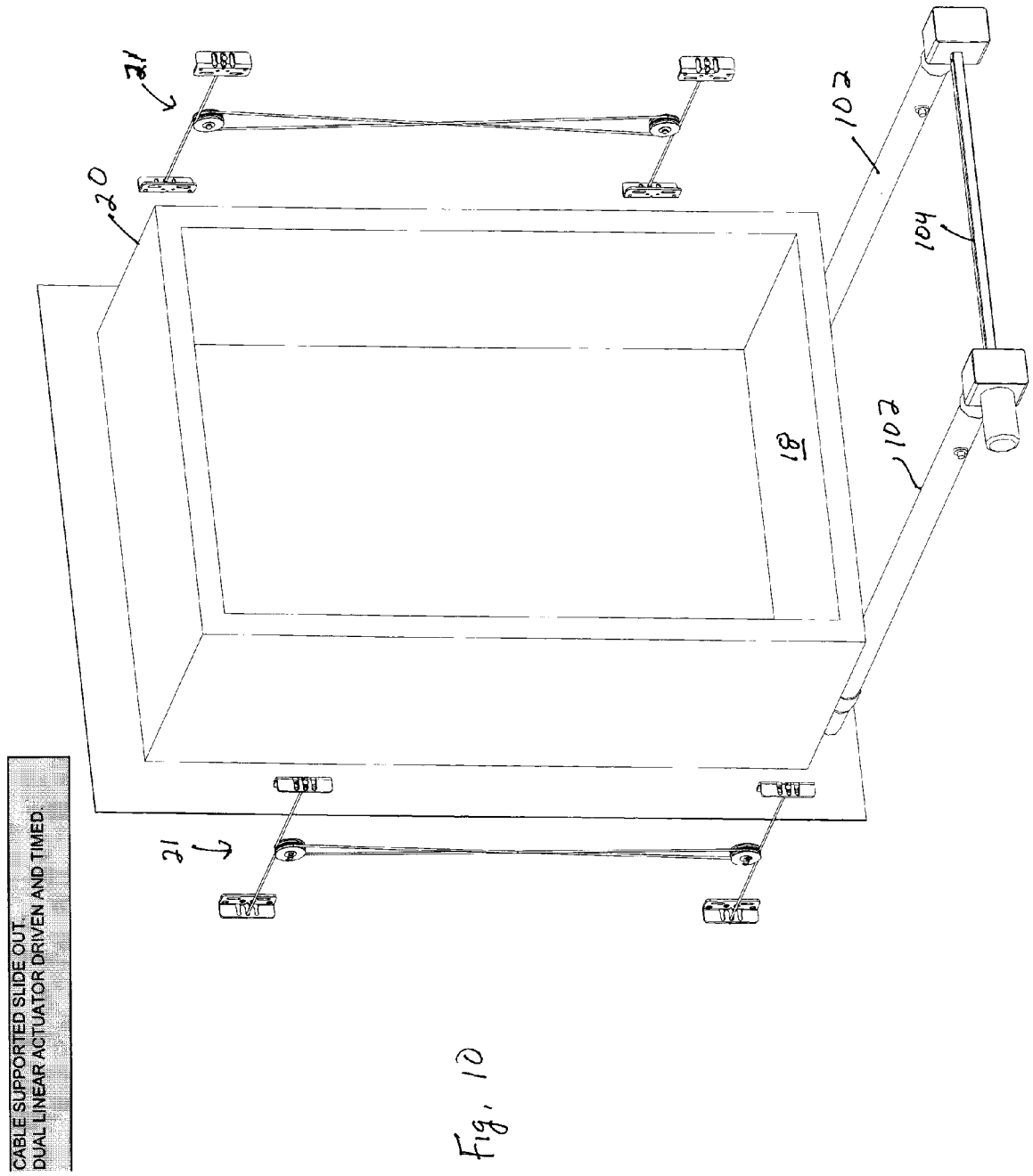
FIG. 10 is a further perspective interior view of the slidable room shown in FIG. 5 showing a further alternative drive mechanism.

FIGS. 6 through 10 illustrate a second embodiment of the present invention. In this embodiment, cable support system 21 does not include a means for timing the movement of room 20. The means for timing is provided by using a plurality of drives 101, 102, 103 with a timing connection 104 between the drives. FIG. 6 shows two rack and pinions drives 101. A mechanical connection 104 between the two drives provides the means for timing the movement of the room. FIG. 9 shows two hydraulic drives 103 with a hydraulic control system 104 for timing the movement of the room. FIG. 10 shows two linear actuators 103 with a mechanical linkage 104 for timing the movement of the room. In operation, room 20 with cable system 21 shown in FIGS. 6 through 10 may also be manually driven.

Referring to FIG. 8, the operation of cable system 21 is illustrated. Two cables 40 are provided for each side of room 20. One cable 40a is connected to the outside top of room 20 and the inside bottom of room 20. The other cable 40b is connected to the inside top of room 20 and the outside bottom or room 20. Both cables pass around two pulleys 36, 37 to change the direction of cables 40a, 40b and to support room 20. Pulleys 36, 37 can be double pulleys or sheaves as shown in the FIGURES or can be two single pulleys.

In operation, as room 20 is extended by drivers 101, 102, 103, the outside top of cable 40a extends and the inside bottom of cable 40a retracts. Correspondingly, the outside bottom of cable 40b extends and the inside top of cable 40b retracts. The operation of cables 40 for the right side is the same as the operation of cables 40 for the left side. When the room 20 is retracted, the opposite motion of the cables 40a, 40b occurs. The inside bottom of cable 40a extends and the outside top of cable 40a retracts. The inside top of cable 40b extends and the outside bottom of cable 40b retracts.

FIGS. 11 through 13 illustrate a latching system for use with cable supported slidable rooms. In particular, this latching system can be used with the slidable room shown in FIGS. 2 through 5. A latch mechanism 90 is provided beneath the floor 18 of slidable room 20. As shown, latch mechanism 90 is mounted to sill 19. In one embodiment, two latches 91 are provided, one latch 91 for latching room 20 in the extended position and the other latch 91 for latching room 20 in the retracted position. Two strikes 80 are provided on the underside of floor 18. A latch 91 engages the corresponding strike 80 to latch room 20 in the desired position.

Each latch 91 has a release lever 92 to release strike 80 from latch 91. In the embodiment shown in the FIGURES, each latch 91 has a separate release lever 92. However, release levers 92 can be interconnected such that operating one release lever 92 operates both latches 91 to a released condition. In the alternative, latch mechanism 90 can have both latches 91 integrated into a single mechanism with a single latch release 92.

One type of latch 91 is an automotive door lock or spring cam latch where, through the operation of cams and springs, latch 91 automatically engages strike 80 when latch 91 and strike 80 move into engagement with one another. Other types of latches that can be used or cam lock, strap locks or retractable pins.

Having described the invention, what is claimed is:

1. A vehicle comprising:
   at least one wall having an opening therein;
   a room inserted into the opening of the at least one wall, the room being reciprocable between an extended position and a retracted position;
   a cable support system attached to the at least one wall and the room including a plurality of cables having first ends and second ends;
   and
   a means for reciprocating the room between the extended position and the retracted position,
   wherein the cable support system comprises:
   a plurality of pairs of cables,
   a plurality of pulleys attached to the vehicle,
   first ends of each cable being attached to the room,
   second ends of the cables being connected together, and
   each cable extending about at least one of the pulleys.

2. The vehicle of claim 1 further comprising first ends of each double-ended cable being connected to a left side of the room and second ends of each double-ended cable being connected to a right side of the room.

3. The vehicle of claim 1 wherein the means for reciprocating the room comprises a plurality of drive mechanisms attached to the room and to the vehicle.

4. The vehicle of claim 3 wherein the plurality of drive mechanisms are hydraulic drives and a means for timing the reciprocation of the room comprises a control system timing the operation of the hydraulic drives.

5. The vehicle of claim 3 wherein the plurality of drive mechanisms are rack and pinion drives and a means for timing the reciprocation of the room comprises a linkage mechanically connecting the rack and pinion drives together.

6. The vehicle of claim 3 wherein the plurality of drive mechanisms are ball screw actuators and a means for timing the reciprocation of the room comprises a linkage mechanically connecting the ball screw actuators together.

7. The vehicle of claim 1 wherein the plurality of pairs of cables includes a first pair of cables and a second pair of cables, wherein the first pair of cables has a first set of second ends that are connected to a second set of second ends of the second pair of cables, forming a connected set of cables.

8. The vehicle of claim 7 wherein the first pair of cables and the second pair of cables are connected to one another by one of a threaded rod, a chain and a cable.

9. The vehicle of claim 7 wherein a first cable end of the first pair of cables is connected to an outside, upper portion of the room and a first cable end of the second pair of cables is connected to a inside, lower portion of the room.

10. The vehicle of claim 7 wherein a first plurality of first ends are connected to a left side of the room and a second plurality of first ends are connected to a right side of the room.

11. A vehicle comprising:
    at least one wall having an opening therein;
    a room inserted into the opening of the at least one wall, the room being reciprocable between an extended position and a retracted position; and
    a cable support system attached to the at least one wall and the room, the cable support system comprising: four pairs of cables including a first pair of cables and a second pair of cables, a plurality of pulleys attached to the vehicle, first ends of each cable being attached to the room, second ends of the cables connected together, wherein the first pair of cables has a first set of second ends that are connected to a second set of second ends of the second pair of cables forming a connected set of cables, each cable extending about at least one of the pulleys, a first cable end of the first pair of cables is connected to an outside, upper portion of the room and a first cable end of the second pair of cables is connected to a inside, lower portion of the room, a first plurality of first ends are connected to a left side of the room and a second plurality of first ends are connected to a right side of the room.

* * * * *